US011397618B2

(12) United States Patent
Kitano et al.

(10) Patent No.: US 11,397,618 B2
(45) Date of Patent: Jul. 26, 2022

(54) RESOURCE ALLOCATION DEVICE, RESOURCE ALLOCATION METHOD, AND RESOURCE ALLOCATION PROGRAM

(71) Applicant: Nippon Telegraph and Telephone Corporation, Tokyo (JP)

(72) Inventors: Takehiro Kitano, Musashino (JP); Kohei Matoba, Musashino (JP); Makoto Araoka, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 17/271,872

(22) PCT Filed: Aug. 27, 2019

(86) PCT No.: PCT/JP2019/033424
§ 371 (c)(1),
(2) Date: Feb. 26, 2021

(87) PCT Pub. No.: WO2020/050094
PCT Pub. Date: Mar. 12, 2020

(65) Prior Publication Data
US 2021/0224120 A1 Jul. 22, 2021

(30) Foreign Application Priority Data
Sep. 3, 2018 (JP) .............................. JP2018-164422

(51) Int. Cl.
*G06F 9/50* (2006.01)
*G06F 11/34* (2006.01)
(52) U.S. Cl.
CPC ............ *G06F 9/505* (2013.01); *G06F 9/5055* (2013.01); *G06F 11/3433* (2013.01); *G06F 2201/815* (2013.01)

(58) Field of Classification Search
CPC .......... G06F 9/50; G06F 9/505; G06F 9/4881; G06F 9/5005; G06F 9/5055;
(Continued)

(56) References Cited

U.S. PATENT DOCUMENTS

2003/0046396 A1* 3/2003 Richter .................. G06F 9/505
709/226
2006/0195715 A1 8/2006 Herington
(Continued)

FOREIGN PATENT DOCUMENTS

JP 2006-244481 9/2006
JP 2017-157910 9/2017
(Continued)

OTHER PUBLICATIONS

Access.redhat.com, [online], "Red Hat Customer Portal 2.3.4. Optional: CPU Pinning," 2018, retrieved on Jun. 28, 2018, retrieved from URL<https://access.redhat.com/...d_hat_enterprise_linux/6/html/virtualization_tuning_and_optimization_guide/ch02s03s04>, 8 pages (with English Translation).

*Primary Examiner* — James N Fiorillo
(74) *Attorney, Agent, or Firm* — Fish & Richardson P.C.

(57) ABSTRACT

Resource use efficiency is improved while realizing quality guarantee of an application. A resource allocation device includes a storage unit that stores resource capacity information indicating a capacity of each of server resources, an SLI information collection unit that acquires information regarding an SLI at a predetermined time interval with regard to each of a plurality of applications, and a resource allocation determination unit that calculates an allocation resource amount of each application using a moving average and a standard deviation of the acquired information regarding the SLI during a predetermined period, and determines server resources which are allocation destinations of the applications by sorting the applications in descending order (Continued)

of the allocation resource amounts and sequentially adding the allocation resource amounts of the sorted applications within a range which does not exceed a capacity of each server resource in descending order of the allocation resource amounts.

9 Claims, 6 Drawing Sheets

(58) Field of Classification Search
CPC .... G06F 9/5083; G06F 11/34; G06F 11/1484; G06F 11/3433; G06F 2201/815; G06F 2209/504; H04L 67/1029
USPC ......................................................... 709/223
See application file for complete search history.

(56) References Cited

U.S. PATENT DOCUMENTS

| | | | | |
|---|---|---|---|---|
| 2008/0059972 | A1* | 3/2008 | Ding | H04L 47/823 |
| | | | | 718/105 |
| 2011/0126206 | A1 | 5/2011 | Kato et al. | |
| 2011/0167424 | A1* | 7/2011 | Murthy | G06F 9/4881 |
| | | | | 709/224 |
| 2012/0066487 | A1* | 3/2012 | Brown | G06F 9/5083 |
| | | | | 709/224 |
| 2012/0066684 | A1 | 3/2012 | Takami | |
| 2013/0054808 | A1* | 2/2013 | Hildebrand | H04L 47/24 |
| | | | | 709/226 |
| 2013/0204990 | A1* | 8/2013 | Skjolsvold | G06F 16/278 |
| | | | | 709/223 |
| 2016/0027108 | A1* | 1/2016 | Addison | H04L 67/1036 |
| | | | | 705/37 |
| 2018/0072327 | A1* | 3/2018 | Seppelt | G06N 20/00 |
| 2019/0129756 | A1* | 5/2019 | Kazakov | G06F 9/5027 |
| 2020/0319925 | A1* | 10/2020 | Clampitt, III | G06F 9/45558 |

FOREIGN PATENT DOCUMENTS

| | | |
|---|---|---|
| WO | WO 2010/050249 | 5/2010 |
| WO | WO 2010/140183 | 12/2010 |

* cited by examiner

Fig. 2

| TIME | APPLICATION 1 | | | |
|---|---|---|---|---|
| | 141 SLI (BANDWIDTH AMOUNT) | 142 AVERAGE VALUE FOR LAST 10 SECONDS | 143 STANDARD DEVIATION FOR LAST 10 SECONDS | 144 ALLOCATION RESOURCE AMOUNT |
| ⋮ | ⋮ | ⋮ | ⋮ | ⋮ |
| 12:00:10 | 233 | 240.5 | 25.0 | 315.3 |
| 12:00:11 | 270 | 243.1 | 26.4 | 322.2 |
| 12:00:12 | 309 | 248.3 | 32.5 | 345.8 |
| 12:00:13 | 330 | 259.4 | 37.3 | 371.3 |
| 12:00:14 | 352 | 265.0 | 45.3 | 401.0 |
| 12:00:15 | 341 | 274.7 | 49.0 | 421.7 |
| 12:00:16 | 340 | 282.5 | 51.9 | 438.1 |
| 12:00:17 | 348 | 289.1 | 55.1 | 454.3 |
| 12:00:18 | 350 | 302.3 | 50.5 | 453.9 |
| 12:00:19 | 341 | 312.4 | 46.0 | 450.3 |
| 12:00:20 | 330 | 322.2 | 36.1 | 430.5 |
| 12:00:21 | 308 | 329.0 | 23.5 | 399.4 |
| 12:00:22 | 278 | 329.7 | 21.7 | 394.8 |
| 12:00:23 | 256 | 324.9 | 30.0 | 415.0 |
| 12:00:24 | 250 | 317.6 | 36.8 | 428.2 |
| 12:00:25 | 255 | 308.8 | 39.1 | 426.1 |
| ⋮ | ⋮ | ⋮ | ⋮ | ⋮ |

RESOURCE ALLOCATION DEVICE, RESOURCE ALLOCATION METHOD, AND RESOURCE ALLOCATION PROGRAM

CROSS-REFERENCE TO RELATED APPLICATIONS

This application is a National Stage application under 35 U.S.C. § 371 of International Application No. PCT/JP2019/033424, having an International Filing Date of Aug. 27, 2019, which claims priority to Japanese Application Serial No. 2018-164422, filed on Sep. 3, 2018. The disclosure of the prior application is considered part of the disclosure of this application, and is incorporated in its entirety into this application.

TECHNICAL FIELD

The present invention relates to a resource allocation device, a resource allocation method, and a resource allocation program controlling server resources shared by physical servers.

In applications such as carrier-based services that have strict Quality regulations, a service level objective (SLO) at end-to-end (E2E) needs to be guaranteed. The SLO is a performance condition guaranteed for service providers and is regulated according to, for example, a throughput or latency.

On the other hand, there is a known technology for providing isolated server resources to applications by blocking physical resources from the outside so that the physical resources cannot be used and allowing applications to occupy the physical resources. For example, the technology of CPU pinning can be used to allow a specific application or a virtual machine to occupy (pin) CPU cores (see NPL 1).

CITATION LIST

Non Patent Literature

[NPL 1] "Red Hat. Customer Portal 2.3.4. *Opusyon: CPU no PINNING (Kotei)*(Option: PINNING (fixing) of CPU)" [online] Red. Hat, [retrieved Aug. 20, 2018] Internet. <URL:https://access.redhat.com/documentation/ja-jp/red_hat_enterprise_linux/6/html/virtualization_tuning_and_optimization_guide/ch02s03s04>

SUMMARY OF THE INVENTION

Technical Problem

In a general environment in which a plurality of applications (APLs) are operated on a server using a server virtualization technology, server resources can be shared by all the applications to improve resource use efficiency. As illustrated in FIG. 5, however, the SLO regulated in each application may be likely to be unsatisfied due to competition for the resources.

On the other hand, when the server resources are occupied through the pinning or the like, for example, the pinned physical CPU cores can be used by only the specific application or the virtual machine. Accordingly, as illustrated in FIG. 6, the SLO regulated in each application is highly likely be satisfied because of the occupation of the server resources, but resource use efficiency may be lowered.

That is, guarantee of the SIC based on isolation of the resources and the resource use efficiency have a tradeoff relation.

The present invention has been devised in view of the foregoing circumstances and an objective of the present disclosure is to provide a resource allocation device, a resource allocation method, and a resource allocation program capable of improving resource use efficiency while realizing guarantee of quality of an application.

Means for Solving the Problem

To solve the foregoing problem, according to the present invention of claim 1, a resource allocation device is connected to a server executing a plurality of applications for which service level objective (SLO) guarantee is necessary and determines allocation of the plurality of applications to a plurality of server resources of the server. The resource allocation device includes: a storage unit configured to store resource capacity information indicating a capacity of each of the server resources; a service level indicator (SLI) information collection unit configured to acquire information regarding an SLI which is a measured value for guaranteeing the SLO at the time of execution of the applications using the server resources with regard to each of the plurality of applications at a predetermined time interval; and a resource allocation determination unit configured to calculate a moving average and a standard deviation of the acquired information regarding the SLI for each application during a predetermined period and calculate an allocation resource amount of each application using the calculated moving average and standard deviation, and configured to determine server resources which are allocation destinations of the applications by sorting the applications in descending order of the calculated allocation resource amounts and sequentially adding the allocation resource amounts of the sorted applications within a range which does not exceed a capacity of each server resource in descending order of the allocation resource amounts.

According to the present invention of claim 4, there is provided a resource allocation method of a resource allocation device that is connected to a server executing a plurality of applications for which service level objective (SLO) guarantee is necessary and determines allocation of the plurality of applications to a plurality of server resources of the server. The resource allocation device includes a storage unit storing resource capacity information indicating a capacity of each of the server resources. The resource allocation method includes: acquiring information regarding a service level indicator (SLI) which is a measured value for guaranteeing the SLO at the time of execution of the applications using the server resources with regard to each of the plurality of applications at a predetermined time interval; calculating a moving average and a standard deviation of the acquired information regarding the SLI for each application during a predetermined period and calculating an allocation resource amount of each application using the calculated moving average and standard deviation; and determining server resources which are allocation destinations of the applications by sorting the applications in descending order of the calculated allocation resource amounts and sequentially adding the allocation resource amounts of the sorted applications within a range which does not exceed a capacity of each server resource in descending order of the allocation resource amounts.

In this way, the resource allocation device can reliably guarantee the SLO and dynamically change an allocation resource amount for each application and the server resources which are allocation destinations in accordance with an actually used resource amount (information of the SLI). Therefore, it is possible to improve the resource use efficiency.

According to the present invention of claim 2, in the resource allocation device according to claim 1, the resource allocation determination unit may calculate the allocation resource amount based on Formula 1 below.

$$\text{Allocation resource amount } R = \text{Moving average } M + (\text{Predetermined coefficient } k) \times \text{Standard deviation } s \qquad \text{Formula 1}$$

In this way, the resource allocation device may not allocate spare resources because of the relation with the SLO as long as resources necessary for an application to perform processing are reliably guaranteed. Accordingly, because the remainder of the resources can be allocated to other applications, it is possible to improve the resource use efficiency.

According to the present invention of claim 3, in the resource allocation device according to claim 1 or 2, the storage unit may store a value regulated with the SLO with regard to the resource amount for each of the applications. The resource allocation determination unit may determine whether the allocation resource amount calculated for each of the applications exceeds the value regulated with the SLO, switch the allocation resource amount to the calculated allocation resource amount when the allocation resource amount exceeds the value, and set the value regulated with the SLO as an allocation resource amount of the application.

In this way, the resource allocation device can prevent an allocation resource amount from being set in the server resources over the value regulated in the SLO related to the application. Accordingly, by ensuring the guarantee of the SLO and then allocating the resources exceeding the SLO to other applications, it is possible to efficiently utilize the resources on the whole.

According to the present invention of claim 5, a resource allocation program causes a computer to function as the resource allocation device according to any one of claims 1 to 3.

In this way, it is possible to realize each function of the resource allocation device according to any one of claims 1 to 3 by using a general computer.

Effects of the Invention

According to the present invention, it is possible to provide a resource allocation device, a resource allocation method, and a resource allocation program capable of improving resource use efficiency while realizing guarantee of quality of an application.

BRIEF DESCRIPTION OF DRAWINGS

FIG. 2 is a diagram illustrating exemplary data is a specific example of resource allocation processing according to the embodiment.

DESCRIPTION OF EMBODIMENT

Next, modes for carrying out the present invention (hereinafter referred to as "embodiment") will be described.

Figure 1:
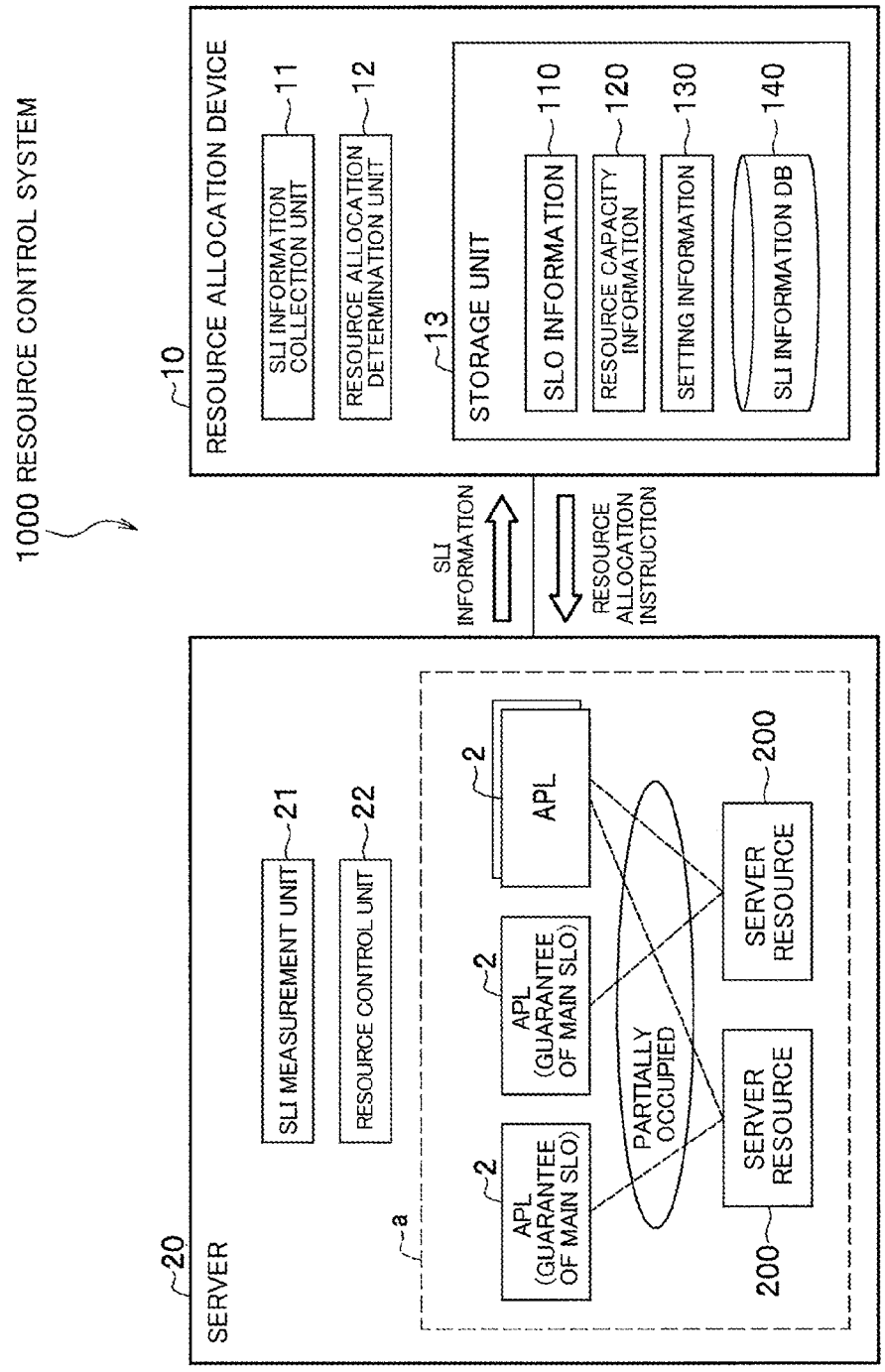
FIG. 1 is a block diagram illustrating a configuration of a resource control system including a resource allocation device according to an embodiment.

FIG. 1 is a block diagram illustrating a configuration of a resource control system 1000 including a resource allocation device 10 according to an embodiment.

The resource control system 1000 includes one or more servers 20 and a resource allocation device 10 that controls allocation of applications (APLs) 2 related to resources of the server 2U (server resources 200). The server 20 and the resource allocation device 10 are connected to communicate with each other to transmit and receive data.

The resource allocation device 10 according to the embodiment collects information regarding a resource amount (a service level indicator: SLI) actually used by each application 2 from the server 20, determines a resource amount allocated to each application 2 (an "allocation resource amount" to be described below) based on the collected SLI, and determines the server resource 200 to be guaranteed.

The server 20 receives a resource allocation instruction indicating information regarding the server resource 200 for guaranteeing a resource and an allocation resource amount determined by the resource allocation device 10. Then, the server 20 does not allow each application 2 to simply occupy the server resource 200 (a physical resource) and supplies the server resource 200 (the physical resource) to each application 2 with the resources partially occupied using a known resource isolation function.

As a known resource isolation function, for example, "cgroup (Control Group)" or "tc (Traffic Control)" which is a module of an open source provided in Linux (registered trademark) can be used.

By using the function of cgroup, it is possible to allocate resources such as a CPU time, a memory, and a disk I/O to specific applications and restrict use of the other applications. By using the function of to (a tc command), it is possible to restrict a bandwidth (allocate a bandwidth amount) to a network interface.

The cgroup is described in detail in, for example, "Control Group v2, [online], Internet <URL:https://www.kernel.org/doc/Documentation/cgroup-v2.txt>". The tc is described in detail in, for example, "How to Use the Linux Traffic Control, [online], NETBEEZ Internet <URL: https://netbeez.net/blog/how-to-use-the-linux-traffic-control/>".

The resource allocation device 10 calculates moving averages and standard deviations of the resource amount (SLI) actually used by the applications 2 during a predetermined time and calculates resource amounts allocated to the applications 2 (allocation resource amounts). The resource allocation device 10 determines the server resources 200 for guaranteeing resources so that a sum of the calculated allocation resource amounts of the applications 2 does not exceed a capacity of the server resources 200.

Thus, the resource allocation device 10 according to the embodiment can reliably guarantee the SLO and dynamically change the allocation resources (the allocation resource amounts and the server resources which are allocation destinations) in accordance with the resource amounts (SLI). Therefore, it is possible to improve resource use efficiency.

Hereinafter, the server 20 and the resource allocation device 10 included in the resource control system 1 will be described in detail.

<Server>

The server 20 is configured by a general computer that includes a control unit, an input-output unit, and a storage unit (none of which is illustrated). The server 20 transmits an SLI which is a measured value to guarantee the SLO of each application 2 to the resource allocation device 10 at a predetermined time interval. The server 20 receives a resource allocation instruction from the resource allocation device 10, allows the server resource 200 to be partially occupied by a resource isolation function, and supplies the server resource 200 to each application 2.

The input-output unit is configured by a communication interface that transmits and receives information to and from the resource allocation device 10 or the like. The storage unit is configured by a hard disk, a flash memory, a random access memory (RAM), or the like.

The control unit includes an SLI measurement unit 21 and a resource control unit 22, as illustrated in FIG. 1.

In the server 20 illustrated in FIG. 1, a portion (reference sign a) surrounded by a dotted line conceptually indicates a relation between the plurality of applications (APLs) 2 and the plurality or server resources 200 used by the applications 2. The server resources 200 according to the embodiment are, for example, CPU cores, network bandwidths set by physical ports (not illustrated), memories, and the like included in the server 20. For each application 2, the SILO (for example, a latency time within 1 msec, a throughput of 10 Mpps, or the like) which is a condition guaranteed for a service provider is assumed to be preset.

The SLI measurement unit 21 measures and stores information regarding a resource amount. (SLI) actually used by each application 2 at a predetermined time interval.

Here, the SLI is, for example, a CPU execution time or a network bandwidth amount used by each application 2. Furthermore, the SLI may be a latency time, a throughput, a use amount of a network bandwidth, the number of times a CPU command is executed, a use amount of a memory bandwidth, a disk I/O, or the like.

The SLI measurement unit 21 measures a resource amount (SLI) of the server resource 200 used by the application 2 for each application 2 executed by the own server 20 and transmits the resource amount to the resource allocation device 10.

The resource control unit 22 has the above-described resource isolation function. (for example, the function of executing "cgroup" or "tc"). When a resource allocation instruction is received from the resource allocation device 10, the server resource 200 used by each application 2 and the allocation resource amount are set using the resource isolation function based on the allocation resource amount and the server resource which is an allocation destination indicated by the resource allocation instruction. Thus, the resource control unit 22 allows the server resource 200 to be partially occupied and supplies the server resource 200 to each application 2.

<Resource Allocation Device>

The resource allocation device 10 collects information regarding a resource amount actually used by each application 2 from the server 20 at a predetermined time interval, determines a resource amount allocated to each application based on the collected SLI, and determines the server resource 200 to be guaranteed (which is an allocation destination).

When the resource allocation device 10 determines the allocation resource (the allocation resource amount and the server resource which is the allocation destination), the resource allocation device 10 uses the moving average and the standard deviation during a predetermined time of the resource amount (SLI) actually used by the application 2 (the details of which will be described).

The resource allocation device 10 is configured by a general computer that includes a control unit and an input-output unit (neither of which is illustrated) and the storage unit 13. The input-output unit is configured by a communication interface that transmits and receives information to and from the server 20 or the like.

The storage unit 13 is configured by a hard disk, a flash memory, a RAM, or the like. The storage unit 13 stores SLO information 110, resource capacity information 120, and setting information 130 in advance information regarding the SLI of each application 2 collected from the server 20 by the SLI information collection unit 11 to be described below is stored in an SLI information DB 140.

In the SLO information 110, information regarding SIC (a performance condition) set for each application 2 is stored.

In the resource capacity information 120, information regarding a capacity of each server resource 200 (the physical resource) of the server 20 is stored. For example, a capacity of a physical port allocating a network bandwidth is stored as "1 Gbps".

In the setting information 130, information regarding a predetermined period and information regarding a coefficient (a predetermined coefficient) of a standard deviation used at the time of determination of the allocation resource amount are stored. For example, "10 seconds" is stored as the predetermined period in which the moving average is calculated and "3" is stored as the coefficient of the standard deviation.

In the SLI information DB 140, information regarding the SLI of each application 2 acquired from the server 20 at the predetermined time interval is stored.

The control unit includes the SLI information collection unit 11 and a resource allocation determination unit 12, as illustrated in FIG. 1. The control unit is realized, for example, by allowing a central processing unit (CPU) (not illustrated) to load and execute a program (a resource allocation program) stored in the storage unit 13 on the RAM.

The SLI information collection unit 11 collects information regarding the resource amount (SLI) actually used by each application 2 at a predetermined time interval from the server 20. Then, the SLI information collection unit 11 stores the collected information regarding the resource amount (SLI) in the SLI information DB 140 in the storage unit 13.

The resource allocation determination unit 12 acquires the information regarding the resource amount (SLI) actually used by the application 2 from the SLI information DB 140 and calculates a moving average and a standard deviation of the information regarding the resource amount (SLI) during the predetermined period. Here, the resource allocation determination unit 12 calculates the moving average based on information regarding the predetermined period stored in the setting information 130 stored in the storage unit 13. The resource allocation determination unit 12 determines the allocation resource amount of the application 2 using the calculated moving average and standard deviation.

For example, the resource allocation determination unit. 12 calculates the allocation resource amount using the following Formula 1.

Allocation resource amount $R$=Moving average $M$+(Predetermined coefficient $k$)×Standard deviation $s$     (Formula 1)

Here, the predetermined coefficient k is a coefficient of the standard deviation. For example, when k=3 is set, about 99.7% of a value of all the resource amounts (SLI) during the predetermined period can be included.

The resource allocation determination unit 12 determines the server resource 200 (the server resource which is an allocation destination) for guaranteeing a resource so that a sum of the calculated allocation resource amounts does not exceed the capacity of each server resource 200.

When the server resource 200 which is the allocation destination is determined, the resource allocation determination unit 12 determines the server resources 200 for guaranteeing resources by sorting the applications 2 in descending order of the allocation resource amounts and sequentially adding the allocation resource amounts within a range which does not exceed a capacity of each server resource 200.

For example, when an allocation resource amount to application "1" is "800 Mbps", an allocation resource amount to application "2" is "500 Mbps", an allocation resource amount to application "3" is "300 Mbps", and the number of physical ports with 1 Gbps is 2, a resource for application "1" is guaranteed from physical port "1" with 1 Gbps and resources for applications "2" and "3" are guaranteed from physical port "2" with 1 Gbps.

When the resource allocation determination unit 12 determines the allocation resource to each application 2 (the allocation resource amount of the server resource 200 and the server resource which is the allocation destination), information regarding the allocation resource is transmitted as a resource allocation instruction to the server 20.

In this way, the resource allocation device 10 can reliably guarantee the SLO and dynamically change the allocation resources of the server 20 in accordance with the SLI. Therefore, it is possible to improve use efficiency of the server resources 200. Accordingly, it is possible to result in a reduction in CAPEX (capital investment) when applications for which guarantee of the SLO is necessary are overlapping used.

SPECIFIC EXAMPLE

Next, a specific example of resource allocation processing in the resource control system 1000 including the resource allocation device 10 according to the embodiment will be described.

Here, an example in which the resource control unit 22 of the serves 20 allocates a network bandwidth amount using "tc (tc command)" in the resource isolation function will be described.

First, the SLI Information collection unit 11 of the resource allocation device 10 collects the information regarding the resource amount (SLI) from the server 20 and stores the information in the SLI information NB 140. Here, as illustrated in FIG. 2, the information (a bandwidth amount (kbps)) regarding the SLI of application "1" is assumed to be collected every second (see reference sign 141 in FIG. 2).

Subsequently, the resource allocation determination unit 12 of the resource allocation device 10 calculates an average value (see reference sign 142 in FIG. 2) of the information regarding the SLI for the past 10 seconds and a standard deviation (see reference sign 143 in FIG. 2) for the past 10 seconds based on a time set as a predetermined period in which the moving average is calculated, for example, "10 seconds", as indicated in the setting information 130 in the storage unit 13.

Subsequently, the resource allocation determination unit 12 calculates the allocation resource amount using the calculated moving average and standard deviation during the predetermined period. Here, in the setting information 130 in the storage unit 13, "3" is assumed to be set as the coefficient (the predetermined coefficient) k of the standard deviation.

The resource allocation determination unit 12 calculates the allocation resource amount R (see reference sign 144 in FIG. 2) using the following Formula 2 based on Formula 1.

Allocation resource amount $R$=Moving average $M$+3×Standard deviation $s$     (Formula 2)

The resource allocation determination unit 12 determines the server resource 200 (the physical resource) from which the resource allocated to each application 2 is guaranteed so that a sum of the calculated allocation resource amounts does not exceed the capacity of the server resources 200 (the physical resources) (in this example, 1 Gbps is set per port). Specifically, the resource allocation determination unit 12 determines the server resources 200 for guaranteeing resources by sorting the applications 2 in descending order of the allocation resource amounts and sequentially adding the allocation resource amounts within the range which does not exceed the capacity of each server resource 200.

Err example, when an allocation resource amount to application "1" is "450 Mbps", an allocation resource amount to application "2" is "400 Mbps", an allocation resource amount to application "3" is "300 Mbps", an allocation resource amount to application "4" is calculated as "100 Mbps", and the number of physical ports with 1 Gbps 2, the resources are guaranteed as follows.

The resource allocation determination unit 12 first guarantees resources for applications "1" and "2" from physical port "1" with 1 Gbps. For application "3" which does not enter physical port "1," a resource is guaranteed from physical port "2". Subsequently, for application "4", a sum of the allocation resource amounts at a present time point of physical port "1" is 850 Mbps (450 Mbps+400 Mbps), and thus the resource does not exceed the capacity of the physical port even when the allocation resource amount of "100 Mbps" of application "4" is added. Therefore, the resource is allocated to physical port "1". In this way, the server resource 200 which is the allocation destination is determined.

When the resource allocation determination unit 12 of the resource allocation device 10 determines the allocation resource to each application 2 (the allocation resource amount and the server resource which is the allocation destination), information regarding the allocation resource is transmitted as a resource allocation instruction to the server 20.

For example, when the resource control unit 22 of the server 20 performs bandwidth control, 450 Mbps of the resource of physical port "1" is guaranteed for application "1", 400 Mbps of the resource of physical port "1" is guaranteed for application "2", and 100 Mbps of the resource of physical port "1" is guaranteed for application "4". Also, 300 Mbps of the resource of physical port "2" is guaranteed for application "3".

Figure 3:
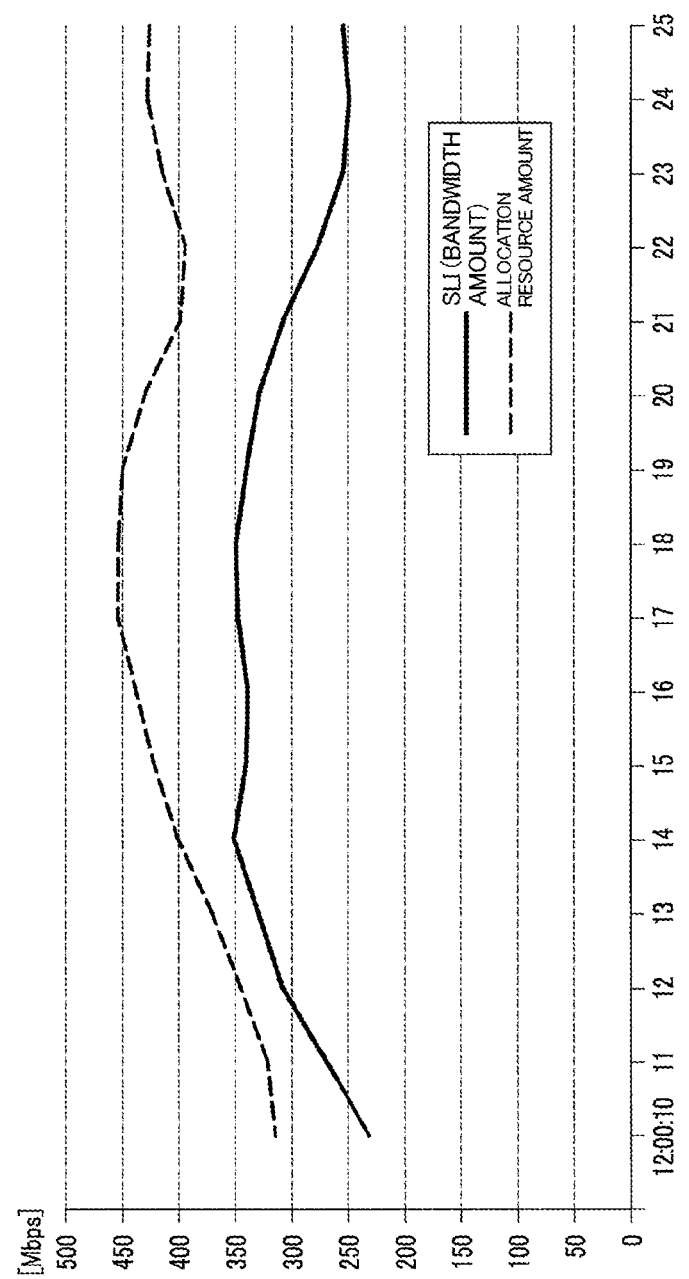
FIG. 3 is a diagram illustrating a time-series SLI (a bandwidth amount) and an allocation resource amount according to the embodiment.

FIG. 3 is a diagram illustrating a time-series SLI (a bandwidth amount) (reference sign 141 in FIG. 2) for application "1" in FIG. 2 and an allocation resource amount (reference sign 144 in FIG. 2) determined by the resource allocation determination unit 12 of the resource allocation device 10.

In FIG. 3, when the SLO of application "1" is "1 Gbps (1000 Mbps)", it is necessary to normally allocate a resource of "1 Gbps" in the related art. According to the embodiment, however, the allocation resource (the allocation resource amount and the server resource which is the allocation destination) can be dynamically changed in accordance with the SLI at that time point. Accordingly, the resources can be efficiently used.

When the value of the allocation resource amount calculated for a certain application 2 exceeds a value regulated with the SLO, the resource allocation determination unit 12 of the resource allocation device 10 switches the allocation resource amount to the calculated allocation resource amount and determines the value determined with the SLO as the allocation resource amount. In this way, resources exceeding the value of the SLO can be allocated to other applications 2 so that the resources exceeding the SLO are not allocated to the application 2.

<Flow of Processing>

Next, a flow of the resource allocation processing performed by the resource allocation device 10 will be described.

Figure 4:
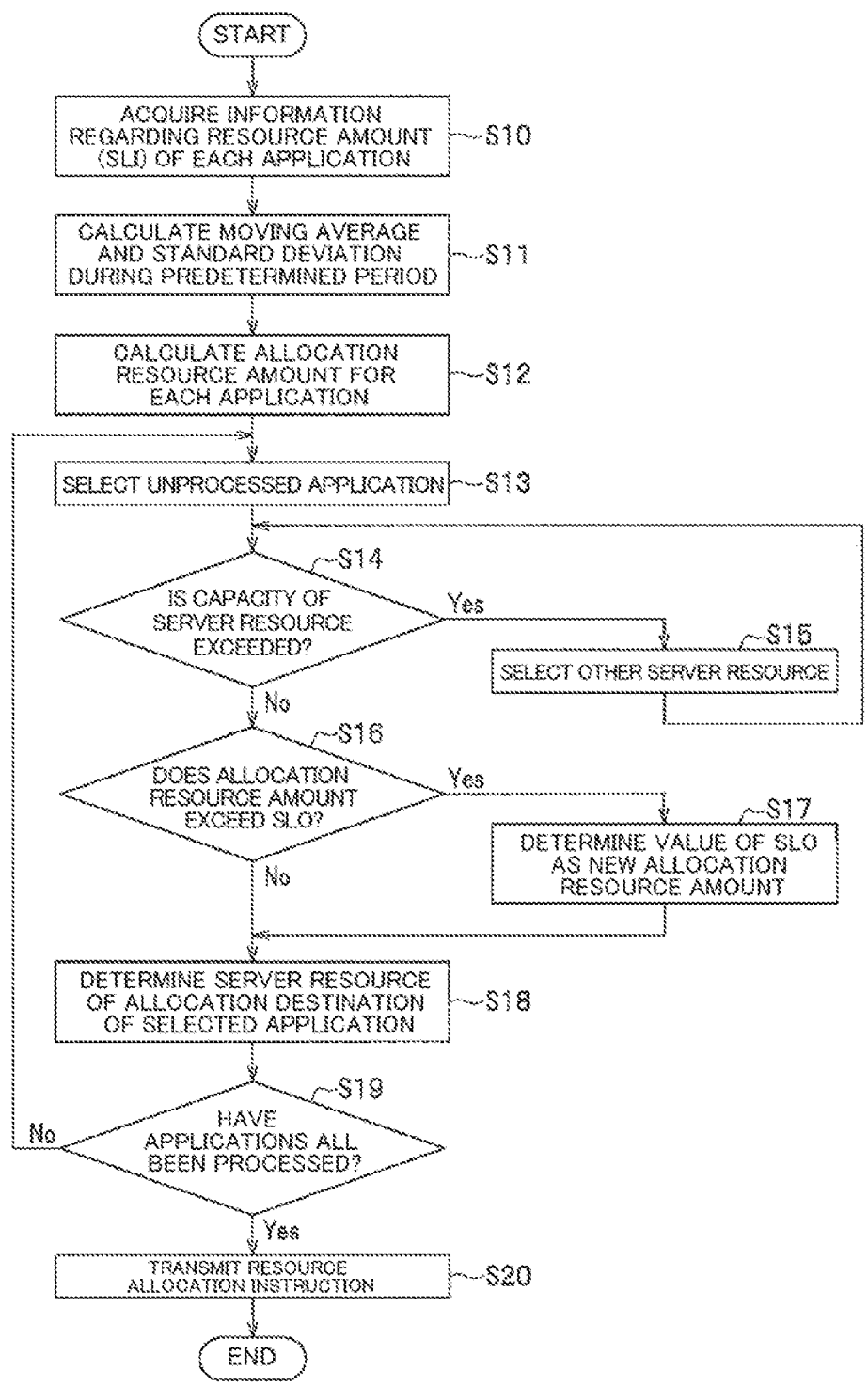
FIG. 4 is a flowchart illustrating a flow of the resource allocation procedure performed by the resource allocation device according to the embodiment.
Figure 5:
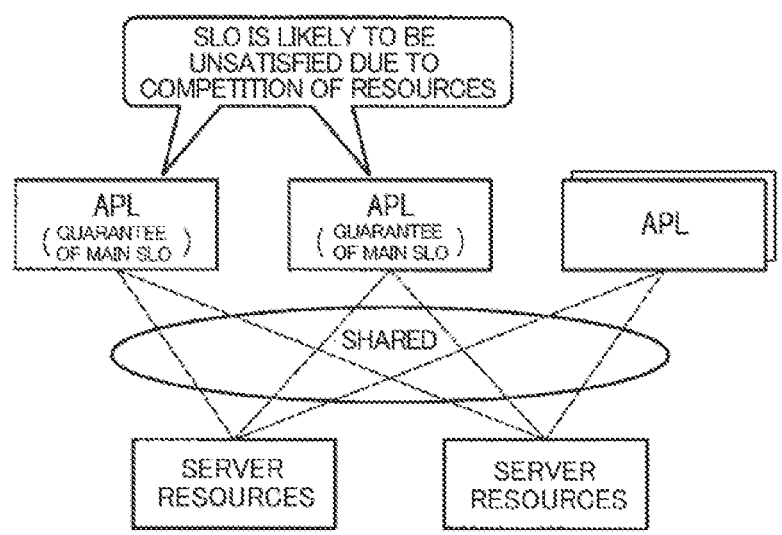
FIG. 5 is a diagram illustrating a problem when resources are shared by a plurality of applications.
Figure 6:
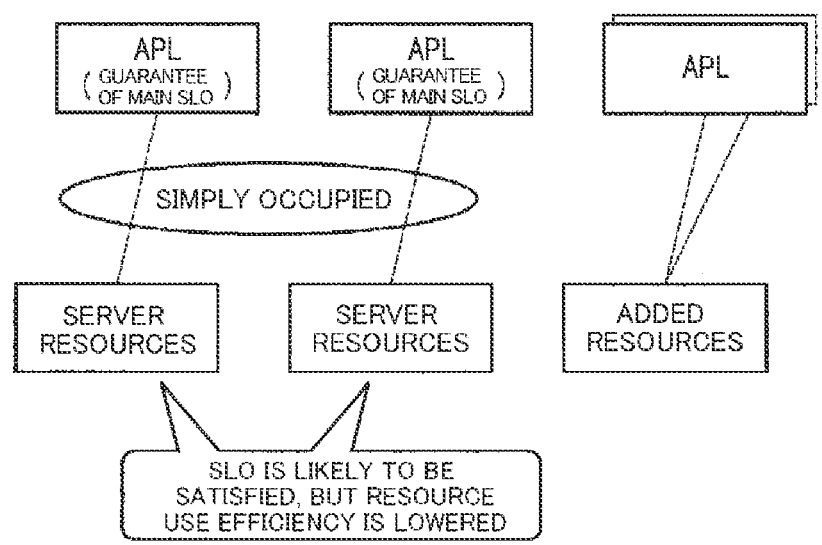
FIG. 6 is a diagram illustrating a problem when resources are occupied by one application.

FIG. 4 is a flowchart illustrating a flow of the resource allocation procedure performed by the resource allocation device 10 according to the embodiment.

The storage unit 13 of the resource allocation device 10 is assumed to store the information regarding the SLO (the SLO information 110) regarding each application 2, the resource capacity information 120 regarding each server resource 200, and the setting information 130 (the information regarding the predetermined period and the information regarding the coefficient of the standard deviation) in advance.

First, the SLI information collection unit 11 of the resource allocation device 10 acquires the information regarding the resource amount (SLI) used by each application 2 from the server 20 (step S10) and stores the information in the SLI information DB 140 (see FIG. 1). Steps S11 to S20 to be described below are performed when the SLI information collection unit 11 acquires the information regarding the resource amount (SLI) from the server 20 at the predetermined time interval.

Subsequently, the resource allocation determination unit 12 of the resource allocation device 10 acquires the information regarding the resource amount (SLI) actually used by the application 2 from the SLI information DB 140 and calculates the moving average and the standard deviation during the predetermined period (for example, 10 seconds) of the information regarding the resource amount (SLI) (step S11).

Subsequently, the resource allocation determination unit 12 calculates the allocation resource amount using the calculated moving average and standard deviation for each application 2 (step S12).

The resource allocation determination unit 12 calculates the allocation resource amount using the above-described Formula 2 based on the coefficient (for example, k=3) of the standard deviation stored as the setting information 130 in the storage unit 13.

Then, the resource allocation determination unit 12 sorts the applications 2 in descending order of the allocation resource amounts and selects one unprocessed application 2 in descending order of the allocation resource amounts (step S13).

Subsequently, the resource allocation determination unit 12 provisionally selects the server resource 200 to which the selected application 2 is allocated. Then, the resource allocation determination unit 12 determines whether a sum of the allocation resource amount of the selected application 2 and the allocation resource amounts of the other applications 2 in which the provisionally selected server resources 200 are set until that time exceeds the capacity of the server resource 200 (step S14).

The order of the provisionally selected server resources 200 among the plurality of server resources 200 is assumed to be set in advance.

When it is determined in step S14 that the sum exceeds the capacity of the server resource 200 (step S14→Yes), the server resource is switched to the server resource 200, another server resource 200 (the subsequently set server resource) is provisionally selected (step S15), and the processing returns to step S14.

Conversely, when it is determined in step S14 that the allocation resource amounts (the sum of the allocation resource amounts) do not exceed the capacity of the server resource 200 (step S14→No), it is determined whether the allocation resource amount of the application 2 exceeds the value regulated with the SLO (step S16).

Here, when the allocation resource amount exceeds the value regulated with the SLO (step S16→Yes), the allocation resource amount is switched to the calculated allocation resource amount and the value regulated with the SLO is determined as a new allocation resource amount (step S17). Then, the processing proceeds to step S18.

Conversely, when the allocation resource amount is equal to or less than the value regulated with the SLO (step S16→No), the processing proceeds to step S18.

In step S18, the resource allocation determination unit 12 determines the provisionally selected server resource 200 as the server resource 200 of the allocation destination of the selected application 2.

Subsequently, the resource allocation determination unit 12 determines whether the applications 2 have all been processed (step S19). Then, when the resource allocation determination unit 12 determines that there is an unprocessed application 2 (step S19→No), the processing returns to step S13. Conversely, when the resource allocation determination unit 12 determines that the applications 2 have all been processed (step S19→Yes), the processing proceeds to step S20.

In step S20, the resource allocation determination unit 12 of the resource allocation device 10 generates a resource allocation instruction including the information regarding the server resources 200 which are the allocation destinations and the allocation resource amount of each application and transmits the resource allocation instruction to the server 20. Then, the processing ends.

The server 20 receives the resource allocation instruction and sets the server resource 200 used by each application 2 and the allocation resource amount using the resource isolation function. Thus, the server 20 allows the server resource 200 to be partially occupied and supplies the server resource 200 to each application 2.

As described above, the resource allocation device, the resource allocation method, and the resource allocation program according to the embodiment can reliably guarantee the SLO and dynamically change allocation resources (the allocation resource amounts and the server resources which are the allocation destinations) in accordance with the resource amounts (SLI). Therefore, it is possible to improve the resource use efficiency.

REFERENCE SIGNS LIST

2 Application (APL)
10 Resource allocation device
11 SLI information collection unit
12 Resource allocation determination unit
13 Storage unit
20 Server 21 SLI measurement unit
22 Resource control unit
110 SLO information
120 Resource capacity information.
130 Setting information
140 SLI information. DB
200 Server resources
1000 Resource control system

The invention claimed is:

1. A resource allocation device that is connected to a server executing a plurality of applications for which service level objective (SLO) guarantee is necessary and determines allocation of the plurality of applications to a plurality of server resources of the server, the resource allocation device comprising:
   a storage medium configured to store resource capacity information indicating a capacity of each of the server resources;
   a service level indicator (SLI) information collection unit, including one or more processors, configured to acquire information regarding an SLI which is a measured value for guaranteeing the SLO at a time of execution of the applications using the server resources with regard to each of the plurality of applications at a predetermined time interval; and
   a resource allocation determination unit, including one or more processors, configured to:
     for each application:
       calculate i) a moving average of the acquired information regarding the SLI during a predetermined period, and
       ii) a standard deviation of the acquired information regarding the SLI during the predetermined period,
     calculate an allocation resource amount of each application using the calculated i) moving average and ii) standard deviation of the application, and
     determine server resources which are allocation destinations of the applications by sorting the applications in descending order of the calculated allocation resource amounts and sequentially adding the allocation resource amounts of the sorted applications within a range which does not exceed a capacity of each server resource in descending order of the allocation resource amounts, wherein the resource allocation determination unit is configured to determine whether the allocation resource amount calculated for each of the applications exceeds the value regulated with the SLO, switch the allocation resource amount to the calculated allocation resource amount when the allocation resource amount exceeds the value, and set the value regulated with the SLO as an allocation resource amount of the application.

2. The resource allocation device according to claim 1, wherein the resource allocation determination unit is configured to calculate the allocation resource amount based on Formula 1 below:

Allocation resource amount $R$=Moving average $M$+(Predetermined coefficient $k$)×Standard deviation $s$    Formula 1.

3. The resource allocation device according to claim 1, wherein the storage medium is configured to store a value regulated with the SLO with regard to the allocation resource amount for each of the applications.

4. A resource allocation method of a resource allocation device that is connected to a server executing a plurality of applications for which service level objective (SLO) guarantee is necessary, determines allocation of the plurality of applications to a plurality of server resources of the server, and includes a storage medium storing resource capacity information indicating a capacity of each of the server resources, the resource allocation method comprising:
   acquiring information regarding a service level indicator (SLI) which is a measured value for guaranteeing the SLO at a time of execution of the applications using the server resources with regard to each of the plurality of applications at a predetermined time interval;
   for each application:
     calculating i) a moving average of the acquired information regarding the SLI during a predetermined period, and
     ii) a standard deviation of the acquired information regarding the SLI during the predetermined period;
   calculating an allocation resource amount of each application using the calculated 1) moving average and ii) standard deviation of the application;
   determining server resources which are allocation destinations of the applications by sorting the applications in descending order of the calculated allocation resource amounts and sequentially adding the allocation resource amounts of the sorted applications within a range which does not exceed a capacity of each server resource in descending order of the allocation resource amounts;
   determining whether the allocation resource amount calculated for each of the applications exceeds the value regulated with the SLO;
   switching the allocation resource amount to the calculated allocation resource amount when the allocation resource amount exceeds the value; and
   setting the value regulated with the SLO as an allocation resource amount of the application.

5. The resource allocation method according to claim 4, further comprising:
   calculating the allocation resource amount based on Formula 1 below:

Allocation resource amount $R$=Moving average $M$+(Predetermined coefficient $k$)×Standard deviation $s$    Formula 1.

6. The resource allocation method according to claim 4, wherein the storage medium is configured to store a value regulated with the SLO with regard to the allocation resource amount for each of the applications.

7. A non-transitory computer readable medium storing one or more instructions causing a computer to function as a resource allocation device that is connected to a server executing a plurality of applications for which service level objective (SLO) guarantee is necessary, determines allocation of the plurality of applications to a plurality of server resources of the server, and includes a storage medium storing resource capacity information indicating a capacity of each of the server resources, the one or more instructions causing the computer to execute:
   acquiring information regarding a service level indicator (SLI) which is a measured value for guaranteeing the SLO at a time of execution of the applications using the server resources with regard to each of the plurality of applications at a predetermined time interval;
   for each application:
     calculating i) a moving average of the acquired information regarding the SLI during a predetermined period, and ii) a standard deviation of the acquired information regarding the SLI during the predetermined period;

calculating an allocation resource amount of each application using the calculated 1) moving average and ii) standard deviation of the application;

determining server resources which are allocation destinations of the applications by sorting the applications in descending order of the calculated allocation resource amounts and sequentially adding the allocation resource amounts of the sorted applications within a range which does not exceed a capacity of each server resource in descending order of the allocation resource amounts;

determining whether the allocation resource amount calculated for each of the applications exceeds the value regulated with the SLO;

switching the allocation resource amount to the calculated allocation resource amount when the allocation resource amount exceeds the value; and setting the value regulated with the SLO as an allocation resource amount of the application.

8. The non-transitory computer readable medium according to claim 7, wherein the one or more instructions further cause the computer to execute:

calculating the allocation resource amount based on Formula 1 below:

$$\text{Allocation resource amount } R = \text{Moving average } M + (\text{Predetermined coefficient } k) \times \text{Standard deviation } s \qquad \text{Formula 1.}$$

9. The non-transitory computer readable medium according to claim 7, wherein the storage medium is configured to store a value regulated with the SLO with regard to the allocation resource amount for each of the applications.

* * * * *